United States Patent Office 2,966,516
Patented Dec. 27, 1960

2,966,516

PREPARATION OF UREA

Fred Applegath and Raymond A. Franz, El Dorado, Ark., assignors to Monsanto Chemical Company, St. Louis, Mo., a corporation of Delaware No Drawing. Filed May 21, 1958, Ser. No. 736,668

2 Claims. (Cl. 260—555)

This invention relates to urea and more particularly to a method for its preparation.

Urea can be prepared by the reaction of carbon monoxide, sulfur and ammonia. Heretofore best yields of urea were obtained when the reaction was carried out in a solvent medium. While the reaction will proceed in the absence of a solvent, considerations of a commercial nature dictate the advisability of using a solvent. Such a technique necessarily requires solvent recovery—a costly step from a commercial standpoint.

An object of this invention is to provide an improved process for preparing urea from carbon monoxide, sulfur and ammonia in the absence of a solvent. Additional objects will become apparent from the description of the process.

It has now been discovered that good yields of urea can be realized by passing carbon monoxide and ammonia through a bed composed of sulfur deposited on an inert carrier, said carrier having an available surface of at least 50 square meters per gram (m.$^2$/g.). Throughout the specification and claims, available surface of the carrier is meant to be the available surface as determined by the well known method of Brunauer, Emmett and Teller as described in J.A.C.S. 60, 309 (1938). The following example illustrates the process of this invention.

A 1" x 12" stainless steel tube was filled with 70 g. of 6–14 mesh activated coconut charcoal having an available surface greater than 50 m.$^2$/g. Sulfur was deposited on the charcoal by passing H$_2$S (0.082 g./min.) and air (0.2 g./min.) through the charcoal for four hours at approximately 190° C. For approximately one hour, NH$_3$ (0.14 mol/hr.) and CO (0.43 mol/hr.) were simultaneously and concurrently passed through the bed while maintaining a temperature of 110° C. and a pressure of 100 p.s.i.g. After the addition of the reactants was stopped, the urea was washed from the bed with 300 ml. of water. The water solution was evaporated to 200 ml. filtered, and the filtrate evaporated to dryness, recovering a 31% yield (based on NH$_3$) of urea.

The bed of sulfur deposited on the carrier can be prepared by any method well known to those skilled in the art. In addition to the method illustrated, the sulfur can be precipitated from a saturated solution on the carrier. Dry mixing of sulfur and carrier can also be used although this method is not preferred.

Any inert carrier having an available surface of at least 50 m.$^2$/g. can be used. Activated wood charcoal, activated petroleum-base carbon, silica gel, attapulgus earth and activated alumina can be used with beneficial results.

The reaction temperature is also subject to substantial variation. The reaction is carried out at an elevated temperature and preferably in the range of from about 60° C. to about 300° C. Reaction temperatures ranging from about 60° C. to about 160° C. are particularly preferred.

The reaction is preferably carried out at pressures above atmospheric although atmospheric pressure can be used if desired. Pressures from atmospheric to as high as 500 p.s.i.g., or even higher, are suitable.

The quantities of reactants can be varied to a considerable extent. At least two molecular proportions of ammonia should be used for each molecular proportion of sulfur and carbon monoxide. Excesses of any of the reactants can be used if desired.

After the reaction has been completed, urea can be removed from the bed by any convenient technique. Usually it is washed therefrom with water and the urea recovering from the washing.

What is claimed is:

1. In a process for preparing urea by reacting carbon monoxide and ammonia in the presence of sulfur, the improvement consisting of depositing the sulfur on an inert carrier selected from the group consisting of activated wood charcoal, activated petroleum base carbon, silica gel, attapulgus earth, and activated alumina having an available surface area of at least 50 square meters per gram and thereafter passing the carbon monoxide and ammonia in a proportion of at least two molecular proportions of ammonia for each molecular proportion of carbon monoxide and sulfur through the bed of inert carrier having sulfur deposited thereon at a temperature of about 60° C. to about 300° C.

2. A process as described in claim 1 wherein the carrier is activated charcoal.

References Cited in the file of this patent

UNITED STATES PATENTS 2,857,430     Applegath et al. _____ Oct. 21, 1958

FOREIGN PATENTS 579,567     Germany _____ June 29, 1933

OTHER REFERENCES

Klemenc: Zeitschrift fur Annorg. und Allgem. Chem., vol. 191, pp. 258–259 (1930).

Hagelloch: Berichte der Deut. Chem. Gesell., vol. 83, pp. 258–261 (1950).